INVENTOR
JAMES S. BELL
BY Stryker & Jacobson
ATTORNEYS

April 11, 1967 J. S. BELL 3,313,549
COMPACT SPREADER FOR PARTICULATE
Filed Sept. 3, 1965 4 Sheets-Sheet 4

INVENTOR
JAMES S. BELL
BY Stryker & Jackson
ATTORNEYS

United States Patent Office 3,313,549
Patented Apr. 11, 1967

3,313,549
COMPACT SPREADER FOR PARTICULATE
James S. Bell, Willmar, Minn., assignor to
Willmar Manufacturing, Willmar, Minn.
Filed Sept. 3, 1965, Ser. No. 484,924
2 Claims. (Cl. 275—8)

This invention relates generally to a trailer type compact spreader for dry fertilizer which is pulled and partly powered by a tractor or the like. In particular the invention is directed toward the construction of an economical, compact spreader having a variety of adjustable features which makes it particularly attractive for farm use. Besides the economies of the machine, other features of the invention are: the axle which carries the single set of ground supporting wheels can be adjusted simply fore and aft to provide for suitable distribution of load weight carried by the hopper; adjustments can be made simply and quickly to vary the spread pattern of the fertilizer on the ground below when desired; and the drive for the conveyor which discharges the particulate from the hopper can be easily and quickly engaged or disengaged by the operation of a relatively simple and inexpensive mechanism.

These and other objects and features of the invention will become apparent during the course of the following detailed description with reference to the accompanying drawings in which.

Figures 3, 4:
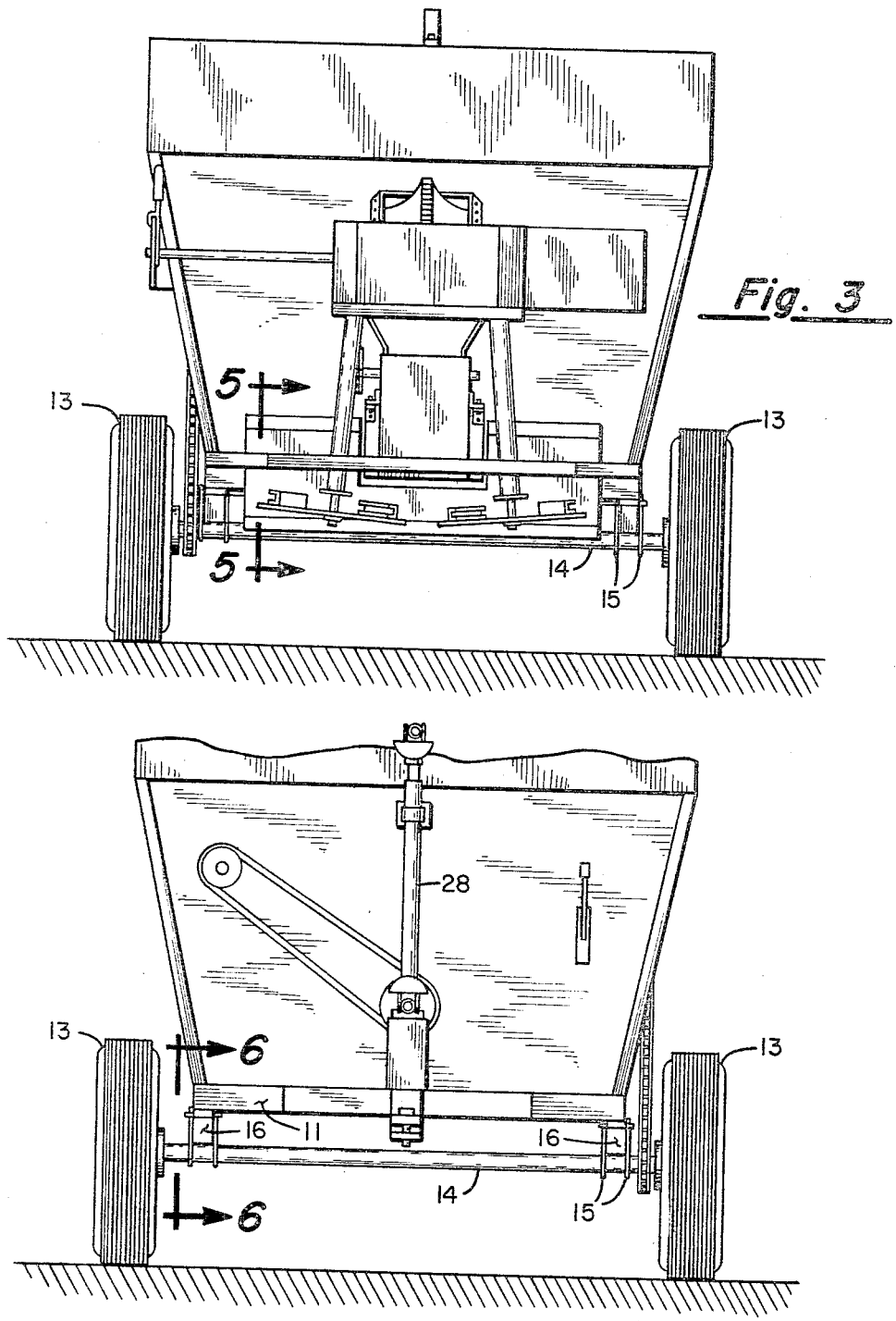
FIGURE 3 is a rear view of the same machine.
FIGURE 4 is a front view of the same machine.
Figure 5:
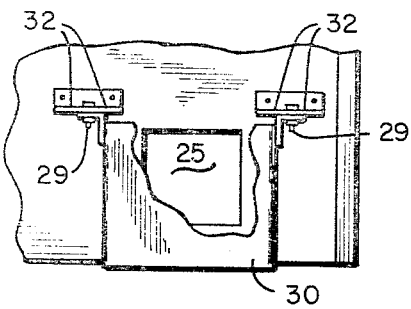
Figure 6:
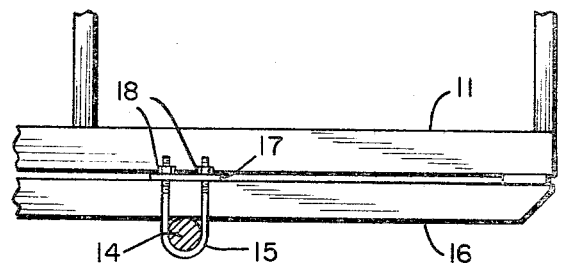
Figure 7:
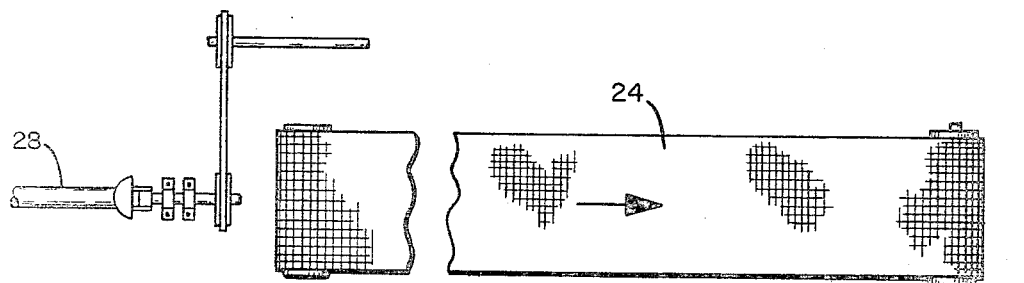
Figure 8:
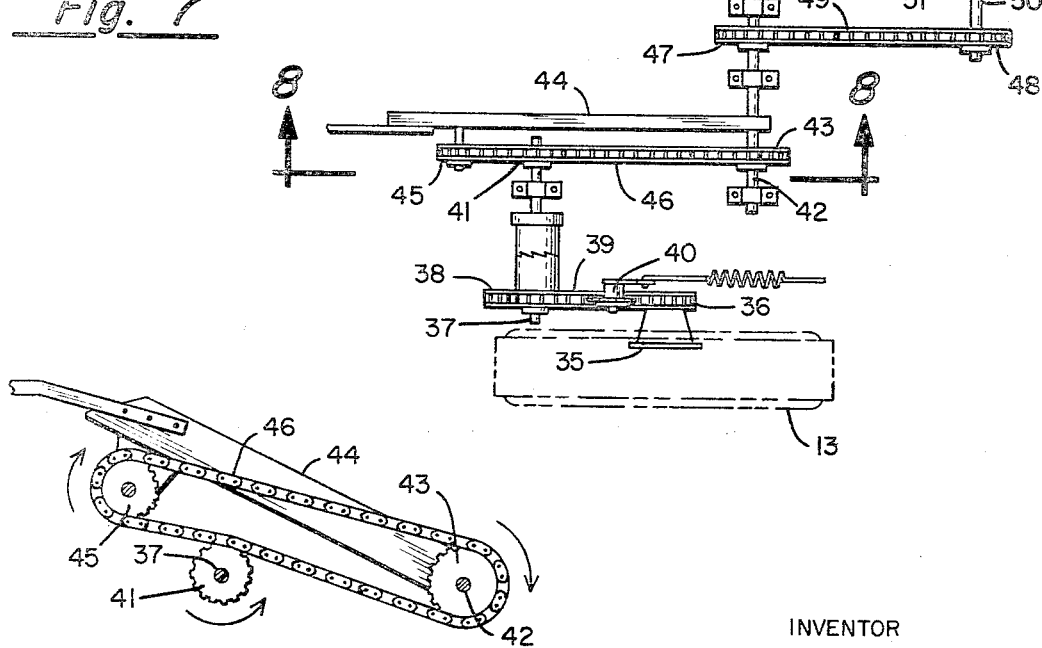

FIGURES 5 and 6 are views along section lines 5—5 and 6—6 of FIGS. 3 and 4 respectively;

FIGURE 7 is a top broken away detailed view of the drive assembly for the conveyor;

FIGURE 8 is a view along section line 8—8 of FIG. 7 to show details of the mechanism for manually engaging the conveyor drive.

Figure 1:
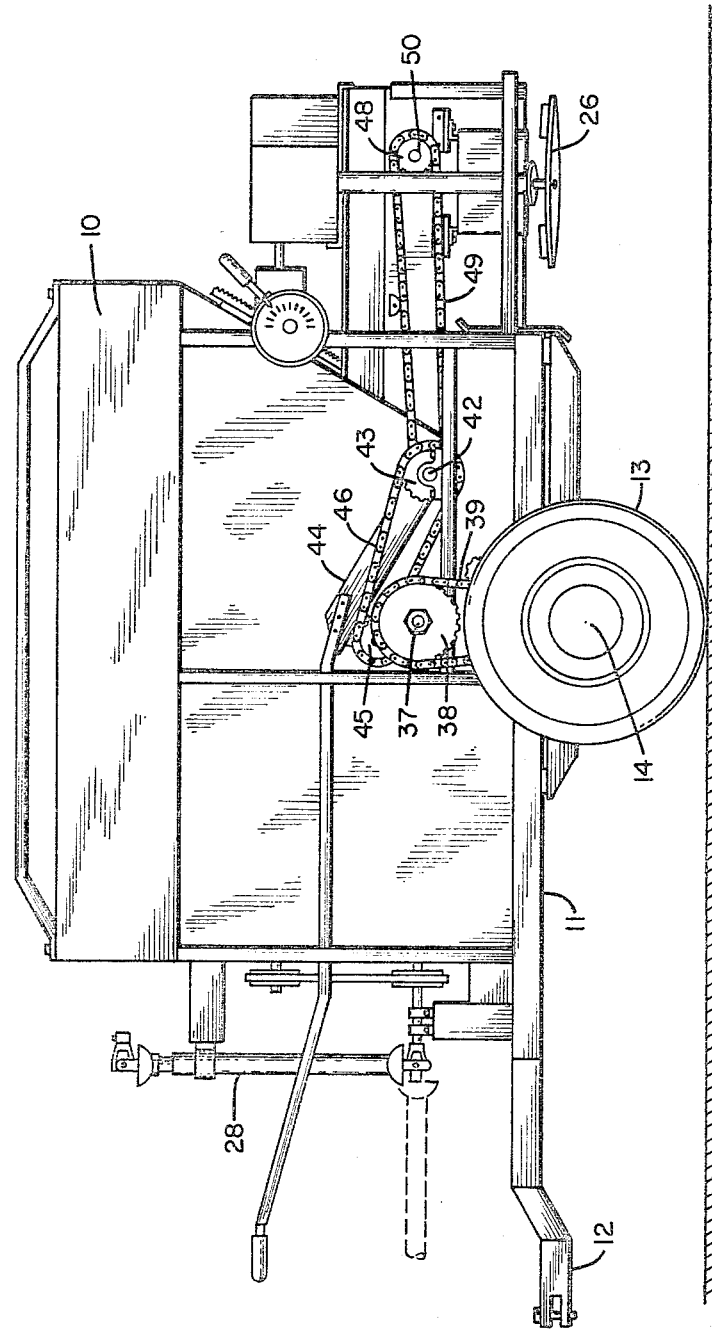
FIGURE 1 is a side view of a machine constructed according to the teachings of this invention and is partially broken away to show some details of the conveyor drive mechanism.
Figure 2:
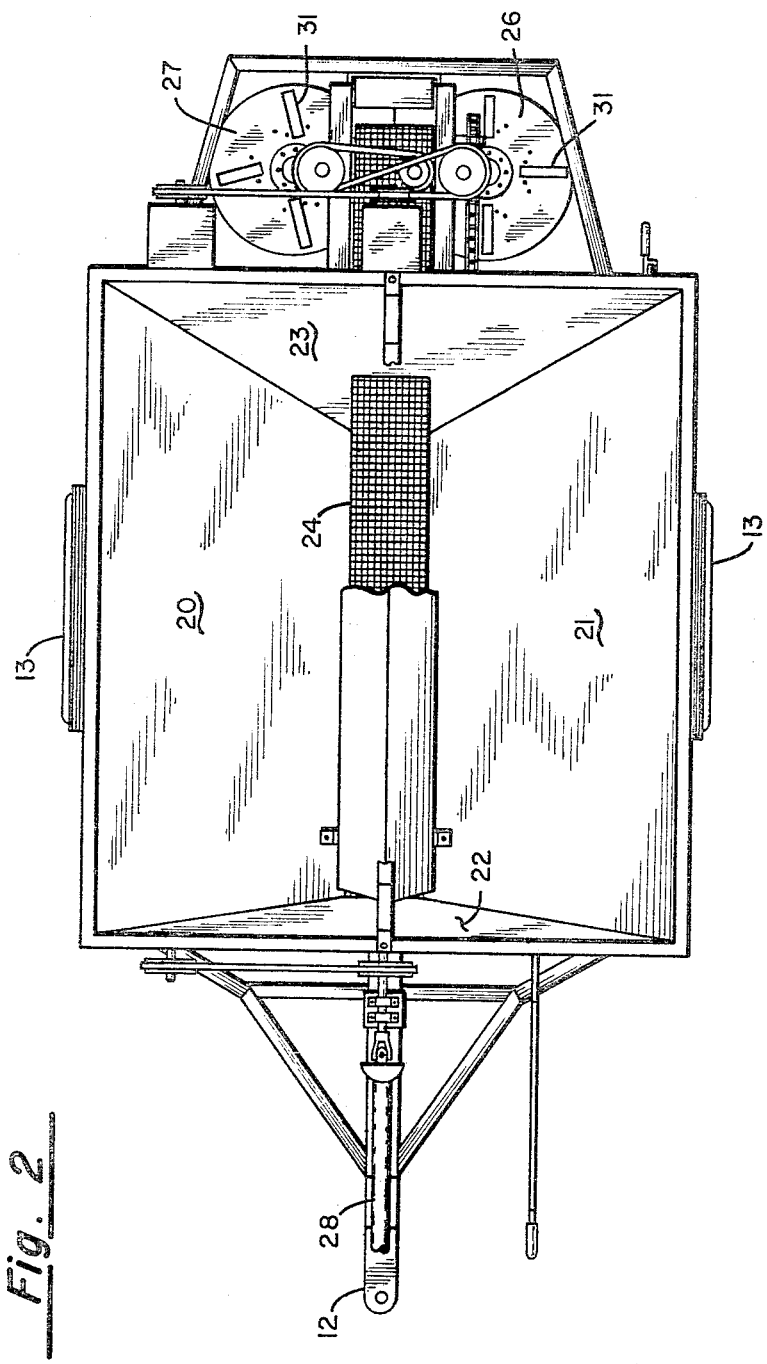
FIGURE 2 is a top view of the machine shown in FIG. 1.

FIGS. 1 and 2 show most of the general overall construction of a preferred embodiment of this invention. The box or hopper 10 which carries a load of fertilizer is bolted or welded to a generally horizontal frame 11. Extending forward of the hopper on the frame 11 is a hitch 12 for coupling to a tractor or truck. A pair of ground supporting wheels 13 are attached to the frame by an axle 14 which extends across the width of the frame. As most clearly viewed in FIGS. 4 and 6 the axle 14 is joined to the frame by a pair of U-bolts 15 at the two sides of the frame. The legs of the U-bolts 15 extend upward around the axle and a bottom plate 16, which is an integral part of the frame 11, and pass through a clamping plate 17 which is above the plate 16. The combination is secured together by nuts 18 threaded on the ends of the U-bolts 15. Merely by partially unthreading the nuts 18, the clamping plate 17 can be loosened sufficiently to slide the axle carried by the U-bolts and the clamping plate 17 along the bottom plate 16 to thereby position the axle as desired to properly distribute the load weight of the fertilizer carried by the hopper.

The left, right, front and rear sides 20, 21, 22 and 23 respectively, of the hopper 10 are sloped inward from the top to the bottom of the hopper to direct the dry fertilizer contained therein down to the endless belt conveyor 24 located at the inside bottom of the hopper. The conveyor when driven carries the fertilizer to the rear of the hopper 10 and discharges it out a discharge opening 25 (FIG. 5) so that it will fall on a pair of distributing discs 26 and 27 located at the outside rear of the hopper. In the usual manner a power take-off shaft 28 is located at the front of the machine for attachment to the tractor and is coupled to the rear of the hopper. This shaft drive is connected through pulleys and drive belts at the rear of the hopper to power the distributing discs 26 and 27 to spread the fertilizer on the ground below.

As can be most clearly observed in FIG. 5, the fertilizer carried rearward by the conveyor 24 passes through discharge openings 25 which are located at each side of the conveyor and which are surrounded by discharge boxes 30 which have closed sides and an open bottom. The discharge boxes are attached to supporting framework which is part of the frame 11 by bolts 29 and the supporting framework has a series of mounting holes 32 to receiving the bolts to permit adjustment of the boxes frontward and rearward with respect to the discharge openings 25. In this manner as the fertilizer passes through the discharge openings it may be directed to strike the discs 26 and 27 below at selected positions so that it will be spread in the desired pattern. The adjustable blades 31 which are attached to the upper side of the distributing discs 26 and 27 likewise provide means for varying the spread pattern of the fertilizer. Although at the factory the blades 31 are bolted onto the discs on a radial line from the center of the discs as seen on disc 26 in FIG. 2, in the field the bolts may be loosened quickly and the blades pivoted about so that they are off the radial line, as shown on disc 27 in FIG. 2, and then the bolts can be tightened. This will affect the manner and the location at which the blades will strike the fertilizer which flows down through the discharge opening onto the discs and will thereby affect the pattern in which the fertilizer is spread on the ground below as the distributor discs continuously whirl.

Referring mainly to FIGS. 1, 7 and 8, the mechanism by which the conveyor 24 is driven to feed the fertilizer out the discharge openings 25 will now be described. A hub 25 surrounding the axle 14 is bolted or otherwise attached to the right hand wheel 13. At its other end there is attached to the hub 25 a sprocket 36 which will, of course, rotate as the wheel 13 turns. Above and parallel to the axle 14 is a drive shaft 37 which has another sprocket 38 attached at the end closest to the right hand wheel 13. The latter sprocket is linked to the sprocket 36 by an endless drive chain 39 so that shaft 37 will be continuously driven as long as the mounting wheel 13 is moving. In the well known manner a slack adjustment at 40 is provided to keep the drive chain 39 relatively taut. Toward its opposite end another sprocket 41 is attached to the drive shaft 37 and rearward from but parallel to the drive shaft 37 is an idler shaft 42. Attached to the latter a sprocket wheel 43 directly behind sprocket 41. All of the shafts are suitably journaled in bearings in the frame 11. Adjacent sprocket 43, an elongated arm 44 is pivotally mounted at one end to shaft 42. The arm 44 carries another sprocket wheel 45 at its other end and an endless drive chain 46 which links sprocket 43 to sprocket 45. The arm 44 is long enough so that when it is swung forward about its pivoted point at idler shaft 42, sprocket 45 will lie forward of sprocket 41 and the drive chain 46 will then link sprocket 41 thereby coupling the drive from the latter to sprocket 43 on shaft 42, such as illustrated in FIG. 8. In this manner rotation of the mounting wheel 13 is transmitted up to the idler shaft 42 whenever the lever arm 44 is in the engaged position. Through suitable mechanisms including another pair of sprockets 47 and 48 linked together by another drive chain 49, and a drive shaft 50 attached to a driving roller 51, rotation of the idler shaft 42 is transmitted to the conveyor 24 so that as the spreader is pulled along the terrain, the conveyor 24 discharges the fertilizer from the hopper 10 onto the distributing discs 26 and 27 for spreading on the ground below. Whenever it is desired not to spread the fertilizer even though the machine is being pulled, the lever arm 44 may be conveniently and easily raised to disengage the drive from the conveyor belt.

Although not shown in the drawings, it is contemplated that means for changing the speed at which the conveyor 24 is driven will be provided. This consists essentially of sets of sprockets 47 and 48 with various teeth ratios. These sprockets are attached to their respective shafts in such a manner that they can be readily detached and replaced in the field. In other words, where it is desired that the fertilizer be spread at a greater rate, the teeth ratio is selected so that the driving roller 51 will rotate at a speed greater than when a lesser rate of discharge is desired.

In the fertilizer spreaders of the nature described, there is a common tendency for the particulate to build up in layers at the bottom of the hopper underneath the conveyor. This not only interferes with the smooth operation of the conveyor but also can lead to irreparable damage to the flooring. It is contemplated that the area underneath the conveyor 24 in the hopper 10 be covered with a protective layer which is chemically inert to the fertilizer and which also protects against abrasion by rubbing and other wearing action. Typically this material may be "Ryertex," a thermosetting laminated phenolic plastic which is a trademarked product of Joseph T. Ryerson & Son., Inc.

I claim:
1. A trailer-type spreader for particulate material, comprising: a hopper having inward sloping sides for carrying particulate material, said hopper fixedly mounted to a rigid supporting frame; a single pair of ground supporting wheels mounted on opposite sides of said frame by an axle which extends across the frame, said axle being slidably adjustable forward and rearward along said frame for positioning the axle to distribute the weight of the hopper load; an endless belt conveyor located at the bottom of the hopper for conveying the particulate to a discharge opening at the rear of the hopper; a first drive shaft parallel to said axle extending from said conveyor to one side of the frame for driving said conveyor; a first sprocket attached to one end of said first drive shaft; a second drive shaft parallel to and located forward of said first drive shaft; means coupling said second drive shaft to one of said mounting wheels for rotating said shaft whenever said mounting wheel rotates; a second sprocket attached to said second drive shaft parallel to and directly in front of said first sprocket; an elongated arm pivotally attached at one end to said first drive shaft being of length to extend beyond said second drive shaft when swung in a forward direction, said arm having a third sprocket rotatably attached at its other end and a drive chain linking said third sprocket to said first sprocket, said chain being brought into engagement with said second sprocket when the arm is swung forward for rotationally driving said first drive shaft and said conveyor by said second drive shaft; rotationally driven, substantially flat distributing discs located below the discharge opening at the rear of the hopper for spreading the particulate discharged by the conveyor as it is driven; said discs having a plurality of upward extending blades attached in an adjustable manner for varying the spread pattern of the partciulate; a box located between the discharge opening and the distributing discs for directing the flow of particulate to said discs; and means for slidably adjusting said box forward and rearward for further varying the spread pattern of the particulate.

2. A trailer-type spreader for particulate material, comprising: a hopper having inward sloping sides for carrying particulate material, said hopper fixedly mounted on a generally horizontal supporting frame; a single pair of ground supporting wheels, each wheel mounted on opposite ends of an axle which extends across the frame in weight-supporting relationship thereto, said axle being slidably adjustable forward and rearward along said frame for distributing the hopper load weight; an endless-belt conveyor located at the bottom of the hopper for conveying the particulate within the hopper to the rear to a discharge opening; a first drive shaft parallel to said axle extending from the conveyor toward one side of the frame for driving said conveyor; a first sprocket attached to the end of said first drive shaft which is toward said one side of the frame; a second drive shaft parallel to and located forward of said first drive shaft; a hub surrounding said axle and attached to the mounting wheel at said one side of the frame for rotating with said wheel; a second sprocket attached to said hub; a third sprocket attached at one end of said second drive shaft; an endless chain linking said second sprocket to said third sprocket in a manner such that thereby the second drive shaft will be rotationally driven by motion of said one wheel irrespective of the location of said axle; a fourth sprocket attached to said second drive shaft arranged parallel to and located directly forward of said first sprocket; an elongated arm pivotally attached at one end to said first drive shaft, the length of said arm being such that it extends beyond said second drive shaft when swung in the forward direction from the first drive shaft, said arm having a fifth sprocket rotatably attached at its other end and an endless chain linking said fifth sprocket to said first sprocket, said chain being brought into linking engagement with said fourth sprocket when the arm is swung forward thereby rotationally driving said first drive shaft and said conveyor from said second drive shaft and said one wheel; rotationally driven, substantially flat distributing discs located beneath the discharge opening at the rear of the hopper for spreading the particulate on the ground below as it is discharged by the driven conveyor, said discs having a plurality of upward extending blades attached in an adjustable manner for varying the ground spread pattern of the particulate; a discharge box located between the discharge opening in the hopper and the distributing discs for directing the flow of the particulate onto said discs; and means for slidably adjusting said box forward and rearward with respect to the discharge opening for further varying the ground spread pattern of the particulate.

References Cited by the Examiner
UNITED STATES PATENTS

| | | | |
|---|---|---|---|
| 823,846 | 6/1906 | Crowell | 74—221 X |
| 2,051,885 | 8/1936 | Neighbor | 275—3 |
| 2,195,572 | 4/1940 | Konicek | 214—85 |
| 2,410,954 | 11/1946 | Messenger et al. | 275—5 |
| 3,085,807 | 4/1963 | Tyler | 275—8 |
| 3,220,740 | 11/1965 | Kavan et al. | 275—6 |

ABRAHAM G. STONE, *Primary Examiner.*

J. R. OAKS, *Assistant Examiner.*